United States Patent
Sylvia

(10) Patent No.: US 10,464,693 B2
(45) Date of Patent: Nov. 5, 2019

(54) LAUNCH CANISTER WITH AIR BAG RAM

(71) Applicant: LOCKHEED MARTIN CORPORATION, Bethesda, MD (US)

(72) Inventor: Russell M. Sylvia, South Dartmouth, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 613 days.

(21) Appl. No.: 14/845,615

(22) Filed: Sep. 4, 2015

(65) Prior Publication Data

US 2017/0066543 A1    Mar. 9, 2017

(51) Int. Cl.
*B64F 1/04*    (2006.01)
*B64C 39/02*    (2006.01)

(52) U.S. Cl.
CPC .............. *B64F 1/04* (2013.01); *B64C 39/024* (2013.01); *B64C 2201/08* (2013.01); *B64C 2201/088* (2013.01); *B64C 2201/20* (2013.01); *B64C 2201/201* (2013.01)

(58) Field of Classification Search
CPC ... B64F 1/04; B64C 39/024; B64C 2201/201; B64C 2201/08
See application file for complete search history.

(56) References Cited

U.S. PATENT DOCUMENTS

| | | | |
|---|---|---|---|
| 3,279,319 A | 10/1966 | Semonian et al. | |
| 6,484,618 B1 | 11/2002 | Dubois | |
| 6,701,819 B1 | 3/2004 | Williams et al. | |
| 7,739,938 B2 | 6/2010 | Nair et al. | |
| 7,832,134 B2 | 11/2010 | Fu et al. | |
| 8,181,906 B2 * | 5/2012 | Koessler | F41F 1/00 244/63 |
| 8,205,828 B2 | 6/2012 | Bossert et al. | |
| 8,205,829 B2 | 6/2012 | Bossert et al. | |
| 8,336,816 B2 | 12/2012 | Miller | |
| 8,439,301 B1 | 5/2013 | Lussier et al. | |
| 8,662,441 B2 | 3/2014 | Powell et al. | |

(Continued)

FOREIGN PATENT DOCUMENTS

| | | |
|---|---|---|
| JP | 2007083837 | 4/2007 |
| WO | 2015127178 | 8/2015 |

OTHER PUBLICATIONS

Gary Mortimer, Sea Corp Successfully Launches Ground-Based Compressed Varriage UAV, https://www.suasnews.com/2009/07/sea-corp-successfully-launches-ground-based-compressed-carriage-uav/, Jul. 2009.*

(Continued)

*Primary Examiner* — Brian M O'Hara
*Assistant Examiner* — Keith L Dixon
(74) *Attorney, Agent, or Firm* — Hamre, Schumann, Mueller & Larson, P.C.

(57) ABSTRACT

A payload launch system that uses an inflatable air bag ram to launch a payload, such as an unmanned aerial vehicle, from a launch chamber of a launch tube. The air bag ram seals with the interior surface of the launch tube to isolate a dump valve that controls the flow of compressed gas from a gas storage chamber into the air bag ram. The air bag ram sealing with the interior surface of the launch tube isolates the dump valve, both pre-launch and post-launch, from any water or debris carried in with water in which the payload launch system is disposed.

6 Claims, 3 Drawing Sheets

(56) References Cited

U.S. PATENT DOCUMENTS

| | | | | |
|---|---|---|---|---|
| 9,033,281 | B1 * | 5/2015 | Adams | B64D 9/00 |
| | | | | 244/190 |
| 9,776,719 | B2 * | 10/2017 | Elkins | B64C 39/024 |
| 9,789,950 | B1 * | 10/2017 | Most | B64C 3/56 |
| 2011/0073707 | A1 | 3/2011 | Bossed et al. | |
| 2012/0001020 | A1 | 1/2012 | Miralles et al. | |
| 2012/0043411 | A1 | 2/2012 | Beck et al. | |
| 2012/0205488 | A1 | 8/2012 | Powell et al. | |
| 2015/0008280 | A1 | 1/2015 | Smoker | |
| 2016/0054097 | A1 | 2/2016 | Sylvia et al. | |

OTHER PUBLICATIONS

International Search Report and Written Opinion for application No. PCT/US2016/050144, dated Nov. 21, 2016 (14 pages).

* cited by examiner

LAUNCH CANISTER WITH AIR BAG RAM

FIELD

This disclosure relates to launching payloads including, but not limited to, unmanned aerial vehicles (UAV).

BACKGROUND

UAVs continue to increase in capability and applications. Transporting and launching small, fragile UAVs can be tedious and time consuming to setup and launch in certain environments. Transport, setup and launch can be extremely challenging in remote covert locations or from a moving platform.

UAVs need to be transported without damaging their fragile structures and time is needed to prepare for flight and launch. Launching UAVs becomes difficult when launching from remote covert locations in harsh environments. Also, UAV's and existing rail type launch systems are not designed to handle prolonged prelaunch exposure in harsh environments. Launching a UAV from a covert underwater platform, moving or not moving, is one example of a harsh environment.

Mobile land vehicles operating in the harsh environments do not currently carry rapid, ready to launch UAV systems or utilize them as a forward scout that are instantly deployed from inside their vehicles. This becomes a particular problem in urban environments where snipers or RPGs await in ambush on roof tops.

Autonomous boats patrolling the perimeter of an anchored ship currently have no method to put a UAV in the air to extend an aerial eye beyond the perimeter and on inbound traffic.

Currently UAVs are launched from moving and fixed platforms. Small UAVs can be launched by hand. The launchers used for moving and fixed platforms are mostly rail type catapults that take time to setup, while the rail and UAV are fully exposed to the environment. Hand launching needs a man to physically throw the small UAV into the air, which might not be an option under fire or in a rapidly moving vehicle. There are specialty launchers specifically designed to launch UAVs from underwater but they cannot be used universally for any other application.

In addition, as demand for remote autonomous operations increases, it becomes difficult and expensive to deliver UAVs to a final covert launch position. The endurance of small UAVs is limited by the battery supply they can carry. Further, current launch techniques of UAVs is typically either a manned operation or requires set-up of a rail type launch system. In the case of manned UAV launch, operators position themselves at the final launch point and release the UAV. This creates a situation of putting humans in harm's way and potentially losing the advantage of surprise.

SUMMARY

A payload launch system is described that uses an inflatable air bag ram to launch a payload from a launch chamber of a launch tube. The launch tube can be used to transport and protect the payload from harsh environments for extended periods prior to launch. The payload can be any unmanned payload that one may wish to transport and launch, and protect the payload from harsh environments for extended periods of time prior to launch. In one embodiment, the payload can be a UAV. In one embodiment, the launch system is used to launch the payload from a marine environment that can be saltwater, freshwater, or brackish water. In one embodiment, the payload launch system is designed to float in water at the surface thereof and launch the payload from the water surface.

The air bag ram seals with the interior surface of the launch tube defining the launch chamber to isolate a dump valve that controls the flow of compressed gas from a gas storage chamber into the air bag ram. The air bag ram sealing with the interior surface of the launch tube isolates the dump valve, both pre-launch and post-launch, from any water or debris carried in with water in which the payload launch system is disposed.

As used herein, a UAV can be any unmanned aerial vehicle designed to fly or float in the air. In one specific embodiment, the UAV can be a folding version sized to fit within the launch tube, with spring loaded, foldable airfoils and a battery powered propulsion system such as a propeller. The term "unmanned" used herein means the payload, such as the UAV, does not physically carry a human operator. In some embodiments, the payload can be completely autonomous so that its operation is preprogrammed with no remote human control or operational intervention after it is launched. In another embodiment, the payload can be semi-autonomous so that some or all of its operation is controlled remotely by one or more human operators after it is launched.

In one embodiment, the payload can be a small folding version of a UAV with spring loaded, folding airfoils disposed in the fully sealed launch tube. Prior to launch, the launch tube can be pressurized with compressed gas that during launch is used to inflate the air bag ram which launches the payload from the launcher. The compressed gas can be any suitable compressible gas including, but not limited to, air, argon, nitrogen, helium, or the like.

In one embodiment, the payload launch system comprises a pre-packaged payload loaded into the launch tube. A sealed cap can be fitted at an end of the launch tube sealing it from harsh environments and prevent ingress of water into the launch tube prior to launch. The launch system is pre-charged with compressed gas making it ready to launch locally or from a remote location. The payload launch system can be physically placed where needed for prolonged exposure.

In one embodiment, the launch tube forms a reusable canister for launching payloads, such as UAVs, from a marine environment. The canister has an air bag ram attached at a base of the launch chamber to protect the dump valve. The dump valve is between a compressed gas storage chamber and the air bag ram at the base of the launch chamber. Without the protection of the air bag ram, the dump valve is susceptible to fouling from water and debris carried in from water. Prior to inflation and after inflation, the air bag ram seals with the interior surface of the launch tube. Further, when inflated, the air bag ram fills substantially the entire volume of the launch chamber. The air bag ram not only keeps debris from reaching the valve, it also keeps water from flooding the launch tube and sinking the launch tube in high sea states. In addition, the air bag ram creates added buoyancy to maintain the launch tube floating in the water after launch.

The air bag ram seals the dump valve and other internal components of the canister from the water and debris. After inflation, the gas remains in the air bag ram until the gas is released through a relief valve. Because the air bag ram seals with the interior surface of the launch tube, the launch tube bore and surface finish of the launch tube bore are not critical, and a ram seal, for example on the air bag ram, can optionally be included but is not required. In addition, noise is contained and muffled in the air bag ram. Further, the air bag ram fills substantially the entire launch chamber when inflated and forms a sealed buoyancy volume that can be reduced or controlled with the relief valve after launch.

DRAWINGS

DETAILED DESCRIPTION

Figure 1:
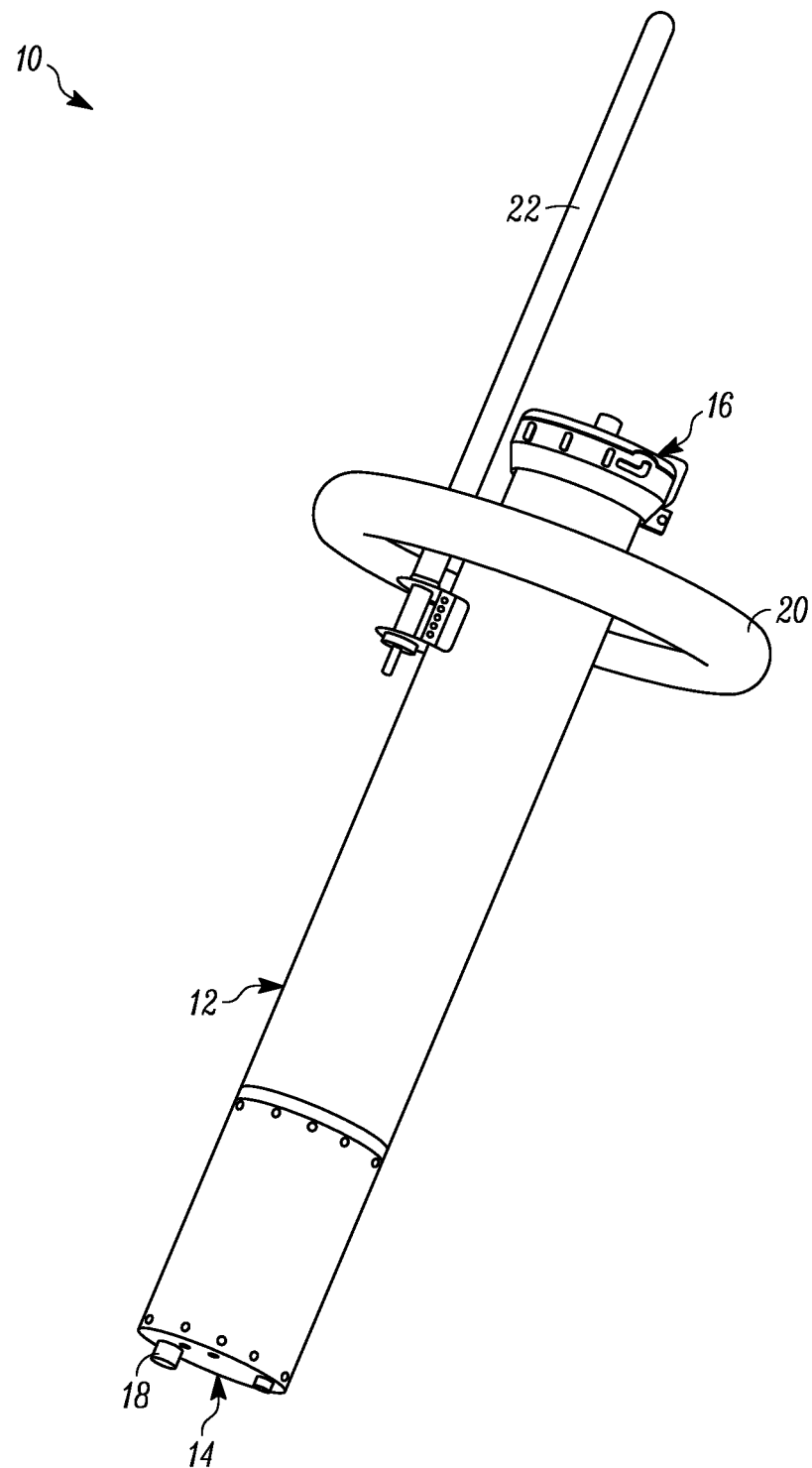
FIG. 1 is a perspective view of the payload launch system.

With reference initially to FIG. 1, one embodiment of a payload launch system 10 described herein is illustrated. The payload launch system 10 will be described herein as launching a payload while the payload launch system 10 is floating in water at the water surface. The water can be seawater, freshwater, or brackish water. However, the payload launch system 10 can be used on land to launch the payload from land, while the launch system is stationary or moving.

For sake of convenience, the payload to be launched by the payload launch system 10 will be described as being a UAV that is designed to be launched into the air and once launched, fly under its own power performing a desired mission. However, the payload can be any unmanned payload that one may wish to transport and launch, and protect the payload from harsh environments for extended periods of time prior to launch. Other examples of payloads that can be launched include, but are not limited to, a balloon with a sensor package, munitions and many others.

The launch system 10 in FIG. 1 is shown in a stowed, ready to launch configuration. The launch system 10 includes a sealed launch tube 12 that is sealed at its bottom end by a service cap 14 and sealed at its top end by a releasable cap 16 that seals the top end of the tube 12 to prevent ingress of water and other contaminants into the launch tube 12 prior to launch. The tube 12 can be made from any material, for example steel, aluminum, or plastic, suitable for withstanding launch pressure and the environments within which the launch system 10 is used.

The service cap 14 controls access to interior components within the base of the launch tube 12. For example, the service cap 14 can include an electronics connection, for example an Ethernet port, permitting I/O connections to electronics within the launch system 10. In addition, the service cap 14 can include a compressed gas filler port 18 through which a compressed gas storage chamber (discussed below) within the launch tube 12 can be charged with a compressed gas.

The releasable cap 16 can be any form of cap that initially closes and seals the top end of the launch tube 12 to prevent ingress of water and other contaminants into the launch tube 12 prior to launch, and that can be removed, either automatically or manually, to permit launch of the payload from the launch tube 12. Removal of the cap 16 is intended to include breaking of the cap 16 by the pressure of the launch of the payload from the launch tube 12. Examples of releasable caps are described in U.S. Pat. Nos. 8,439,301, 8,205,829, 8,205,828, and U.S. Published Application Nos. 2011/0073707 and 2012/0043411.

An inflatable float ring 20 is shown in FIG. 1 as being connected to the launch tube 12 below the top end thereof. The float ring 20 causes the launch tube 12 to float at the surface of the water with the top end of the launch tube 12 above the surface of the water. It is to be realized that when launching from land or out of water applications, the float ring 20 is not utilized.

The launch tube 12 can also include a communication antenna 22 through which communications can be sent to and from the launch system 10. For example, launching of the payload can be triggered upon receipt of a launch signal; deflation of the float ring 20 can occur upon receipt of a suitable signal; the launch system 10 can transmit location data, sensory data, status data, and other data to a receiving location; and the like.

Figure 2:
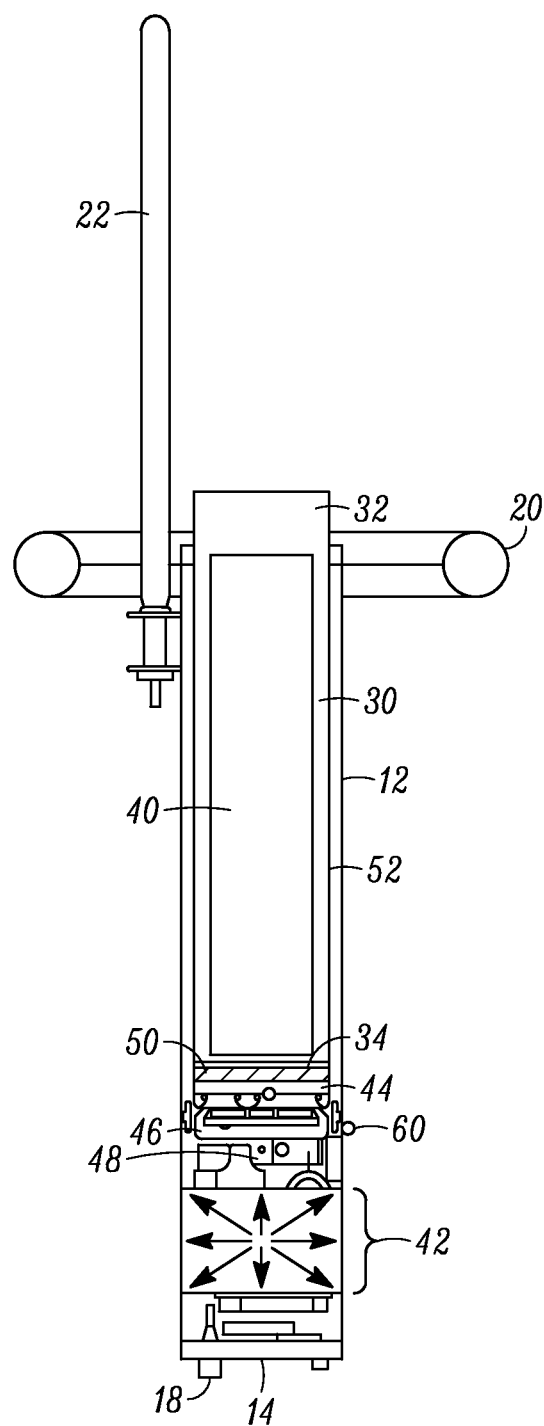
FIG. 2 is a cross-sectional side view of the payload launch system of FIG. 1 prior to launch of the payload.

FIG. 2 is a cross-sectional side view of the payload launch system 10 prior to launch of a payload. For sake of convenience, the cap 16 is not illustrated in FIG. 2 although the cap 16 would normally be in place at the top end of the launch tube 12 prior to launch. The launch tube 12 defines a launch chamber 30 having an open first end 32 that is normally closed by the cap 16 prior to launch and a second end 34 opposite the open first end 32. A payload 40 is disposed within the launch chamber 30, with the payload 40 being launchable through the open first end 32 of the launch chamber 30 after removal of the cap 16. The payload 40 can be a UAV or any other payload that one may want to launch from the launch tube 12.

A compressed gas storage chamber 42 is formed within the launch tube 12 at the base end thereof. The compressed gas storage chamber 42 is designed to be filled with and contain a compressed gas including, but not limited to, air, argon, nitrogen, helium, or the like, which is used to launch the payload 40 from the launch tune 12. The gas storage chamber 42 can be charged with pressurized gas through the gas filler port 18.

A payload ejection mechanism is provided in the launch tube 12 for ejecting or launching the payload 40 through the first end 32. The payload ejection mechanism is expandable from a pre-launch state where the payload ejection mechanism is located between the second end 34 and the payload 40 to an expanded state where the payload ejection mechanism occupies substantially the entire launch chamber 30. In the illustrated embodiment, the payload ejection mechanism comprises an inflatable air bag ram 44 that is disposed at the second end 34 of the launch chamber 30. The air bag ram 44 is disposed between a fixed wall 46 that defines the second end 34 or bottom end of the launch chamber 30 and the base of the payload 40. The air bag ram 44 is in selective, controlled fluid communication with the gas storage chamber 42 via a dump valve 48. The dump valve 48 is closed prior to launch, but can be automatically opened by a suitable control on the launch system 10 to permit rapid introduction of compressed gas from the gas storage chamber 42 into the air bag ram 44 to rapidly inflate the air bag ram 44 causing the air bag ram 44 to expand upwardly in the launch chamber 30 which ejects the payload 40 from the launch chamber 30. Once the payload 40 is launched, the dump valve 48 can be closed to retain any residual compressed gas within the compressed gas storage chamber 42. Operation of the dump valve 48 can occur automatically after a predetermined amount of time has elapsed, for example a predetermined amount of time after the launch system 10 is deployed into the water, by a signal received via the antenna 22, based upon one or more sensed conditions around the launch system 10, manually, or combinations thereof.

Figure 3:
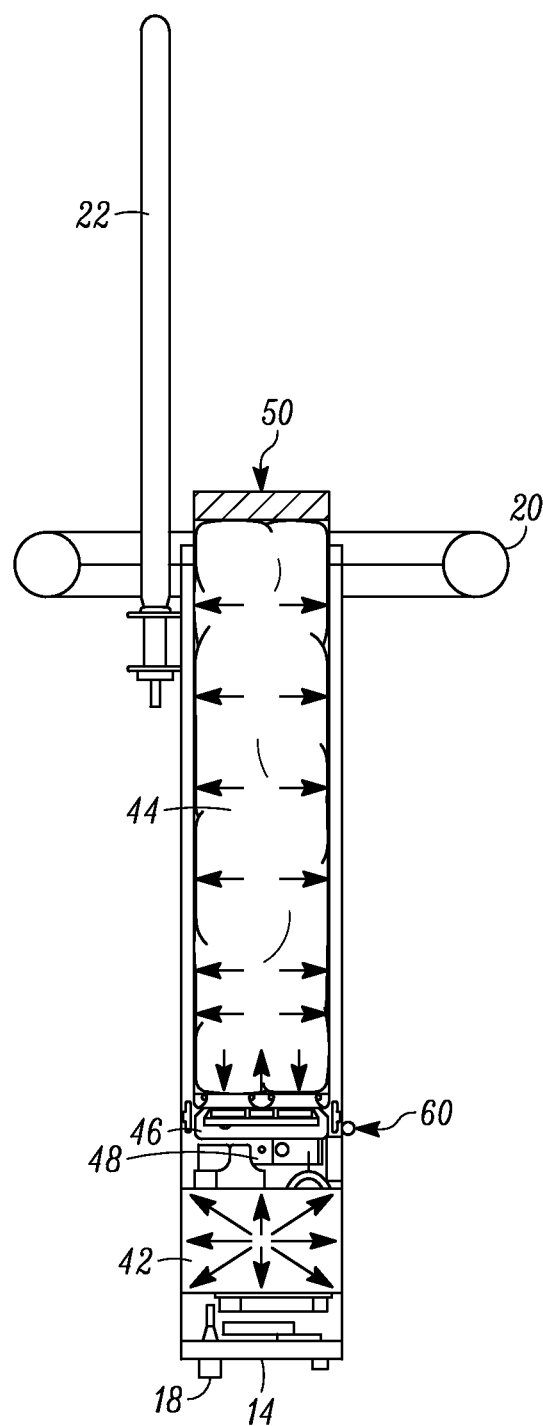
FIG. 3 is a cross-sectional side view of the payload launch system of FIG. 1 after launch of the payload.

FIG. 2 illustrates the air bag ram 44 in its pre-launch compressed state within the launch chamber 30. FIG. 3 illustrates the air bag ram 44 in an expanded launch state within the launch chamber 30 after the dump valve 48 has been opened to eject the payload 40 from the launch chamber 30. A ram plate 50 (illustrated in FIGS. 2 and 3) can be fixed to the upper end of the air bag ram 44 and disposed between the air bag ram 44 and the payload 40. In some embodiments, the ram plate 50 is not utilized, in which case an upper end of the air bag ram 44 can be in direct engagement with the base of the payload 40.

In both its pre-launch compressed state and its expanded launch state, the air bag ram 44 is sealed with an interior surface 52 of the launch tube 12 that defines the launch chamber 30. The sealing provided by the air bag ram 44 prevents water and other contaminants from entering the launch tube 12 and reaching the dump valve 48, thereby isolating the dump valve 48 from the water and other contaminants that could interfere with operation of the dump valve 48, for example if the launch tube 12 is re-used. In an optional embodiment, the ram plate 50 (if used) can be in sealing engagement with the interior surface 52 either directly or via one or more separate seals, such as a lip seal, mounted on the ram plate 50. In another optional embodiment, one or more separate seals can be provided on the air bag ram 44 to help seal with the interior surface 52.

Referring to FIG. 3, the air bag ram 44 fills substantially the entire launch chamber 30 when in its expanded launch state. In one embodiment, no portion of the air bag ram 44 extends out through the first end 32 of the launch tube 12 in the expanded launch state. In embodiments where the ram plate 50 is used, the ram plate 50 is pushed upwardly toward the first end 32, but no portion of the ram plate 50 extends out through the first end 32 of the launch tube 12 in the expanded launch state as illustrated in FIG. 3. Because the air bag ram 44 fills substantially the entire launch chamber 30 when in its expanded launch state, and the air bag ram 44 seals with the interior surface 52 of the launch tube 12, the air bag ram 44 prevents water from entering and filling the launch tube 12. In addition, the expanded air bag ram 44 forms a sealed buoyancy volume that increases the buoyancy of the launch tube 12 to maintain the launch tube 12 floating in the water after launching the payload 40.

A relief valve 60 can be provided that is in fluid communication with the air bag ram 44 to reduce the amount of gas in the air bag ram 44 after launch. The relief valve 60 can be provided at any location on or in the launch tube 12 that permits access for reducing the amount of gas in the air bag ram 44. In the example illustrated in FIGS. 2 and 3, the relief valve 60 is located so as to be accessible from an exterior of the launch tube 12. For example, the relief valve 60 can be provided on an exterior of the launch tube 12 near a base of the air bag ram 44. The relief valve 60 can be actuated open, manually or automatically, to allow gas to escape from the air bag ram 44, thereby deflating the air bag ram 44 and reducing its buoyancy. In some embodiments, the relief valve 60 is not in fluid communication with the gas storage chamber 42 so only gas from the air bag ram 44 is drained through the relief valve 60. However, if more complete removal of compressed gas from the system 10 is desired, the relief valve 60 could be in fluid communication with the gas storage chamber 42 and/or the dump valve 48 could be opened during draining of the air bag ram 44.

In embodiments where the launch system 12 is not intended to be re-used, the launch tube 12 can be made to sink after launching the payload 40. For example, the float ring 20 can be provided with a scuttle patch that causes the float ring 20 to deflate, automatically or via actuation, after a period of time. In addition, the relief valve 60 can automatically open after a period of time to deflate the air bag ram 44 and/or the air bag ram 44 can be provided with a scuttle patch that causes the air bag ram 44 to deflate, automatically or via actuation, after a period of time.

The payload launch system 10 can be transported to a desired launch location by a separate transport means where the launch system 10 is then deployed from the transport means. For example, the launch system 10 can be deployed underwater from a submarine, from an autonomous underwater vehicle, from a surface vessel, or manually by a swimmer or diver, with the launch system 10 subsequently floating to the water surface via the float ring 20. The launch system 10 can also be deployed into the water from the air, for example dropped from a surface vessel or dropped from an aircraft.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A payload launch system, comprising:
    a launch tube defining a launch chamber with a first end and a second end opposite the first end;
    a payload disposed within the launch chamber, the payload is ejectable through the first end of the launch chamber;
    a payload ejection mechanism within the launch tube and engaged with the payload to eject the payload through the first end, the payload ejection mechanism includes an inflatable air bag ram fixed in the launch chamber at the second end thereof and engaged with the payload, the air bag ram is expandable by a compressed gas from a pre-launch state where the air bag ram is located between the second end and the payload to an expanded state where the air bag ram occupies the entire launch chamber; and
    in the expanded state, the air bag ram is sealed with an interior surface of the launch tube that defines the launch chamber.
2. The payload launch system of claim 1, further comprising:
    a compressed gas storage chamber in the launch tube containing the compressed gas, the compressed gas storage chamber is fluidly connectable to the air bag ram to expand the air bag ram to the expanded state; and
    a valve that selectively places the compressed gas storage chamber in fluid communication with the air bag ram.
3. The payload launch system of claim 1, wherein the payload is an unmanned aerial vehicle.
4. The payload launch system of claim 2, further comprising a ram plate fixed to the air bag ram and engaged with the payload.
5. The payload launch system of claim 2, further comprising a relief valve in fluid communication with the air bag ram.
6. The payload launch system of claim 5, wherein the relief valve is accessible from an exterior of the launch tube.

* * * * *